Dec. 12, 1939.　　　B. C. NICHOLS　　　2,183,483
SAFETY GAS LINE SHUT-OFF
Original Filed April 13, 1937　　　2 Sheets-Sheet 2
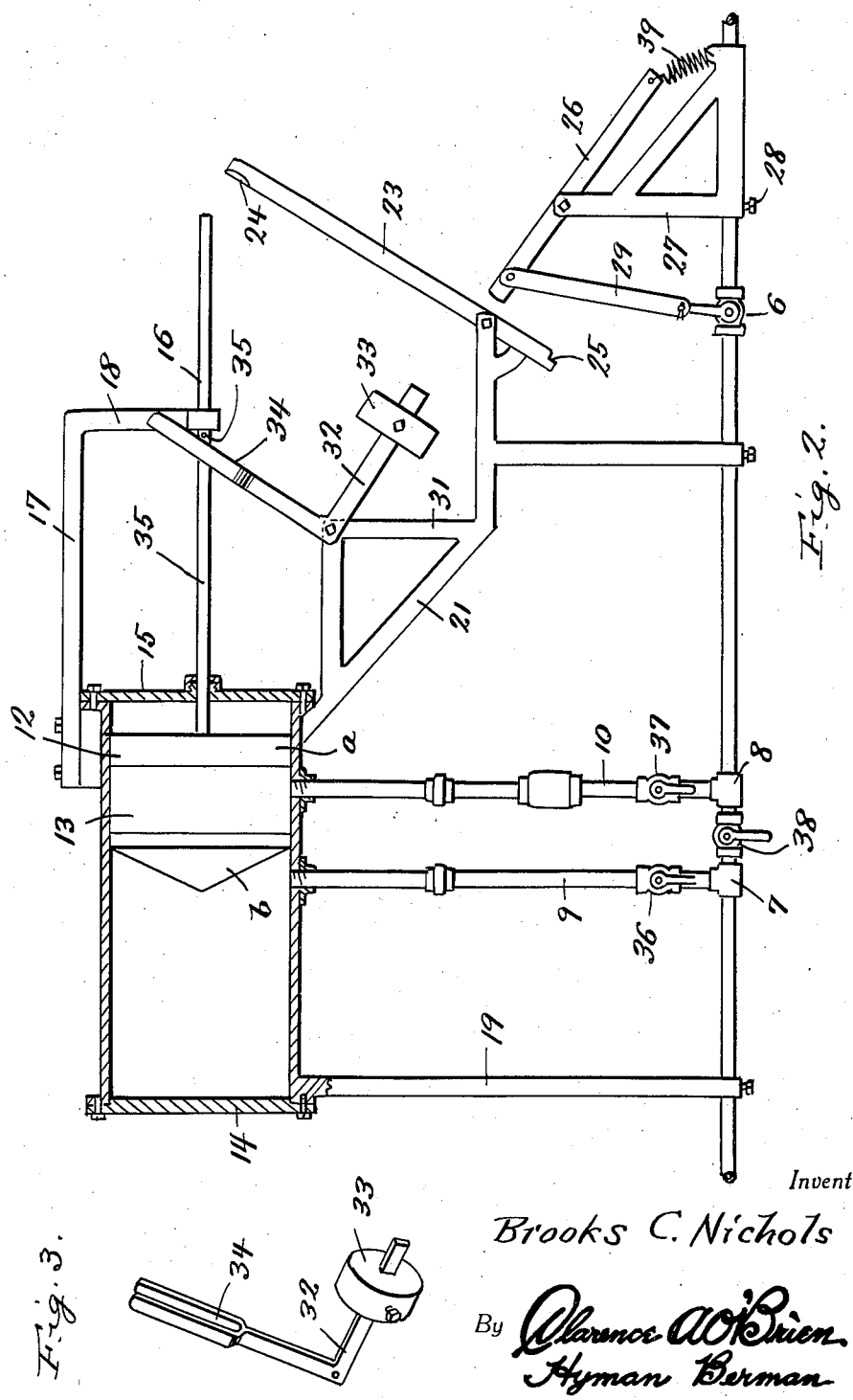
Inventor
Brooks C. Nichols
By Clarence A. O'Brien
Hyman Berman
Attorneys Patented Dec. 12, 1939

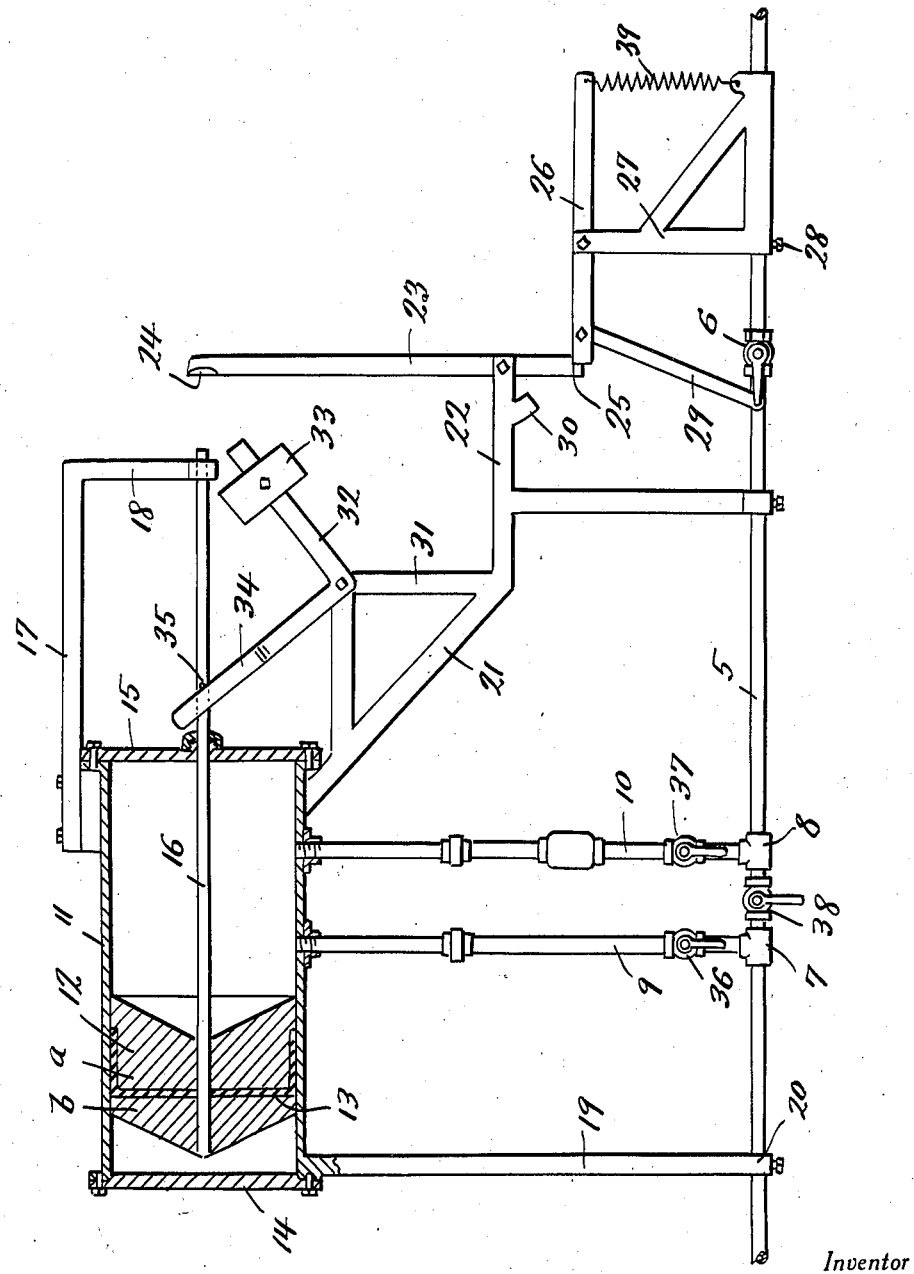

2,183,483

UNITED STATES PATENT OFFICE 2,183,483

SAFETY GAS LINE SHUT-OFF

Brooks C. Nichols, Sissonville, W. Va.

Application April 13, 1937, Serial No. 136,693
Renewed May 22, 1939

3 Claims. (Cl. 137—153)

This invention appertains to new and useful improvements in automatic shut-offs for gas lines.

The principal object of the present invention is to provide an automatic shut-off for consumers gas lines whereby the gas supply will be shut off automatically in the event its pressure weakens or fails, to the extent that a flame will become extinguished.

Other important objects and advantages of the invention will become apparent to the reader of the following specification.

In the drawings:

Figure 1 represents a side elevational view of the apparatus partly in section showing the details in position maintaining the gas line open.

Figure 2 is a side elevational view of the apparatus showing the details in line closed position.

Figure 3 is a perspective view of the weighted fork.

Referring to the drawings wherein like numerals designate like parts, it can be seen that numeral 5 represents the gas line having the shut-off valve 6 therein. Numerals 7—8 represent a pair of closely situated T-members in the line 5 which connect up the line 5 with the branch pipes 9—10, respectively. These branch pipes 9—10 connect to the bottom of the cylinder 11 in which the plunger 12 operates. The plunger 12 consists of the sections a—b between which the packing member 13 is clamped. The ends of the cylinder 11 are provided with removable heads 14—15 and through the head 15 is slidable the rod 16 which projects from the piston 12. An elongated arm 17 projects from one end of the cylinder 11 and has a depending leg 18 apertured at its lower end to serve as a guide for the outer end of the rod 16.

A post 19 extends downwardly from the cylinder 11 and clamps to the pipe 5 as at 20.

An inclined bracket member 21 extends downwardly from one end of the cylinder 11 and has the horizontal extension 22 at its lower end to which is secured the vertically disposed rocker 23. The upper end of this rocker 23 is formed for engagement by the rod 16 while its lower end is notched as at 25 for engagement with the underlying end of the rocker 26 supported by the bracket 27, the latter being secured by suitable means 28 to the pipe line 5. A link 29 has its upper end connected to the rocker 26 and its lower end to the arm of the valve 6. A short protuberance 30 on the horizontal portion 22 of the bracket 21 serves as a stop for the rocker 23 (see Figure 2).

A mount 31 is formed on the bracket 21 for rockably supporting the bell crank 32, one end portion of which is adapted to accommodate the adjustable weight member 33 while its opposite end is forked as at 34 to straddle the rod 16. The rod 16 is provided with a cross pin 35 for abutment with the fork end 34.

As is shown in Figure 1, valve structures 36—37 are provided in the branch pipes 9—10 and a valve structure 38 is provided in the pipe line 5 between the T-members 7—8.

It can now be seen, that gas under normal pressure passes through the pipe line 5 to the consumers appliance when the valve 6 is open. The route taken by the gas under pressure is along the pipe line 5 to the branch 10, into the cylinder 11 and back through the branch pipe 9 to the line 5 at the opposite side of the valve 38. The valve 38 during this travel of the gas under pressure is closed. The gas under pressure thus in the cylinder 11 keeps the plunger 12 to the left, holding the weight 33 elevated.

In the event the gas pressure fails, the plunger 22 will be moved toward the right by the gravitating effect of the weight 33 and as this takes place the plunger rod 16 will engage the rocker 33 and rock the same to trip the rocker 26 so that the spring 39 will swing the rocker 26 and exert a pull on the link 29 which will close the valve 6. Thus, the gas line is shut off. When the apparatus is not desired for operation, the parts can be set as shown in Figure 1 with the exception that the valves 36 and 37 are closed while the valve 38 is open.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A safety shut-off apparatus for gas lines comprising a cylinder, a plunger in the cylinder, a rod extending from the plunger, a rocker in the path of the rod, a pair of branch pipes extending from the gas line to the cylinder, a valve in the gas line between the branch pipe connection thereto, said pair of branch pipes together with the cylinder constituting a bi-pass around the valve when said valve is closed, a shut-off valve on the gas line, and trip means between the said rocker and the shut-off valve adapted to be operated when the rocker is moved by the plunger rod, said plunger operating to close passage through the branch pipes upon releasing of said trip means.

2. A safety shut-off apparatus for gas lines comprising a cylinder, a plunger in the cylinder, a rod extending from the plunger, a rocker in the path of the rod, a pair of branch pipes extending from the gas line to the cylinder, a valve in the gas line between the branch pipe connection thereto, said pair of branch pipes together with the the cylinder constituting a bi-pass around the valve when said valve is closed, a shut-off valve on the gas line, and trip means between the said rocker and the shut-off valve adapted to be operated when the rocker is moved by the plunger rod, said plunger operating to close passage through the branch pipes upon releasing of said trip means, and a shut-off valve in each of the branch pipes.

3. A safety shut-off apparatus for gas lines comprising a cylinder, a plunger in the cylinder, a rod extending from the plunger, a rocker in the path of the rod, a pair of branch pipes extending from the gas line to the cylinder, a valve in the gas line between the branch pipe connection thereto, said pair of branch pipes together with the cylinder constituting a bi-pass around the valve when said valve is closed, a shut-off valve on the gas line, and trip means between the said rocker and the shut-off valve adapted to be operated when the rocker is moved by the plunger rod, said plunger operating to close passage through the branch pipes upon releasing of said trip means, said trip means consisting of a rocker, means for tensioning the rocker, a link connection between the rocker and the shut-off valve, said last-mentioned rocker adapted to be held by the first-mentioned rocker.

BROOKS C. NICHOLS.